(12) United States Patent
Axelrad et al.

(10) Patent No.: US 9,598,572 B2
(45) Date of Patent: Mar. 21, 2017

(54) EPOXY RESIN COMPOSITIONS

(71) Applicant: SOLVAY SPECIALTY POLYMERS USA, LLC., Alpharetta, GA (US)

(72) Inventors: Shari W. Axelrad, Atlanta, GA (US); Charles Moses, Marietta, GA (US); Ahmed Khan, Alpharetta, GA (US); Narmandakh Taylor, Alpharetta, GA (US); Charles R. Hoppin, Alpharetta, GA (US)

(73) Assignee: SOLVAY SPECIALTY POLYMERS USA, LLC., Alpharetta, GA (US)

( * ) Notice: Subject to any disclaimer, the term of this patent is extended or adjusted under 35 U.S.C. 154(b) by 52 days.

(21) Appl. No.: 14/365,493

(22) PCT Filed: Dec. 11, 2012

(86) PCT No.: PCT/EP2012/075011
§ 371 (c)(1),
(2) Date: Jun. 13, 2014

(87) PCT Pub. No.: WO2013/087592
PCT Pub. Date: Jun. 20, 2013

(65) Prior Publication Data
US 2014/0329973 A1    Nov. 6, 2014

Related U.S. Application Data

(60) Provisional application No. 61/576,559, filed on Dec. 16, 2011.

(30) Foreign Application Priority Data

Feb. 16, 2012  (EP) .................... 12155760

(51) Int. Cl.
| | | |
|---|---|---|
| C08L 63/00 | (2006.01) |
| B29C 33/00 | (2006.01) |
| B29C 43/00 | (2006.01) |
| B29C 44/34 | (2006.01) |
| B29C 45/00 | (2006.01) |
| B29C 45/02 | (2006.01) |
| B29C 51/00 | (2006.01) |
| B29C 70/02 | (2006.01) |
| B29K 63/00 | (2006.01) |
| B29K 81/00 | (2006.01) |

(52) U.S. Cl.
CPC .............. *C08L 63/00* (2013.01); *B29C 33/00* (2013.01); *B29C 43/003* (2013.01); *B29C 44/3415* (2013.01); *B29C 45/0001* (2013.01); *B29C 45/02* (2013.01); *B29C 51/002* (2013.01); *B29C 70/021* (2013.01); *B29C 2791/002* (2013.01); *B29C 2791/003* (2013.01); *B29C 2791/006* (2013.01); *B29C 2945/00* (2013.01); *B29C 2947/00* (2013.01); *B29K 2063/00* (2013.01); *B29K 2081/06* (2013.01); *C08L 2205/02* (2013.01); *C08L 2205/03* (2013.01); *C08L 2205/06* (2013.01)

(58) Field of Classification Search
CPC ...... C08L 63/00; C08L 81/06; C08L 2205/02; C08L 2205/03; C08L 2205/06; B29K 2063/00; B29K 2081/06; B29C 2791/002; B29C 2791/003; B29C 2791/006; B29C 2947/00; B29C 2945/00; B29C 33/00; B29C 43/003; B29C 70/021; B29C 44/3415; B29C 45/0001; B29C 45/02; B29C 51/002; C08G 59/50; C08G 75/20; C08G 75/23

See application file for complete search history.

(56) References Cited

U.S. PATENT DOCUMENTS

| | | |
|---|---|---|
| 3,634,355 A | 1/1972 | Barr et al. |
| 4,008,203 A | 2/1977 | Jones |
| 4,108,837 A | 8/1978 | Johnson et al. |
| 4,175,175 A | 11/1979 | Johnson et al. |
| 4,656,208 A * | 4/1987 | Chu ............... C08G 59/50 428/209 |
| 5,086,156 A | 2/1992 | McGrath et al. |
| 5,364,914 A | 11/1994 | Choate et al. |
| 5,453,463 A | 9/1995 | Weber et al. |
| 2003/0139494 A1 | 7/2003 | Weber et al. |
| 2005/0038170 A1* | 2/2005 | Alig ............... C08L 63/00 524/492 |
| 2006/0292375 A1 | 12/2006 | Martin |
| 2009/0234068 A1* | 9/2009 | Horiuchi ........... C08G 75/0277 524/609 |
| 2011/0311816 A1* | 12/2011 | Kanomata ........... C08G 65/40 428/402 |

FOREIGN PATENT DOCUMENTS

| | | |
|---|---|---|
| EP | 486044 A2 | 5/1992 |
| EP | 583224 A2 | 2/1994 |

(Continued)

*Primary Examiner* — Randy Gulakowski
*Assistant Examiner* — Christopher M Rodd
(74) *Attorney, Agent, or Firm* — Jarrod N. Raphael; Dwight M. Benner, II

(57) ABSTRACT

An epoxy resin composition [composition (C)] comprising: (i) from 30 to 90% by weight of at least one epoxy compound [compound E], based on the total weight of the composition (C); (ii) from 0 to 60% by weight of at least one curing agent [agent C], based on the total weight of the composition (C); (iii) from 0 to 15% by weight of at least one accelerator, based on the total weight of the composition (C); (iv) from 1 to 60% by weight of at least one poly(aryl ether sulfone) (I) [PAES (I-1)], based on the total weight of the composition (C) and wherein said PAES (I-1) polymer comprises amine functional groups in an amount equal to or more than 200 µeq/g; (v) from 1 to 60% by weight of at least one poly(aryl ether sulfone) (I) [PAES (I-2)], based on the total weight of the composition (C), and wherein said PAES (I-2) polymer is different from the PAES (I-1) polymer.

13 Claims, No Drawings

(56) References Cited

FOREIGN PATENT DOCUMENTS

| | | |
|---|---|---|
| JP | 3068896 B | 7/2000 |
| JP | 2005105151 A | 4/2005 |
| JP | WO 2009022591 A1 * | 2/2009 ............. C08G 65/40 |

* cited by examiner

EPOXY RESIN COMPOSITIONS

This application is a U.S. national stage entry under 35 U.S.C. §371 of International Application No PCT/EP2012/075011, filed Dec. 11, 2012, which claims priority to U.S. application No. 61/576,559 filed on Dec. 16, 2011 and to EP application 12155760.7 filed on Feb. 16, 2012, the whole content of each of these applications being incorporated herein by reference for all purposes.

FIELD OF INVENTION

The invention relates to thermoplastic toughened epoxy resin compositions comprising epoxy resins and functionalized poly(aryl ether sulfone)s, to a process for their manufacture and to the use of the same for the manufacture of cured articles.

BACKGROUND OF THE INVENTION

Neat or fiber reinforced epoxy resins cure to form highly crosslinked materials characterized by brittle nature and poor thermal conductivity. As a consequence, said materials are limited in their use in many engineering applications, for example in electrical engineering, automotive engineering, and also in construction industry, where special performances, such as good mechanical, thermal and electrical properties, are required. In order to improve the strength, the damage tolerance and the toughness of the parts made from such materials, many efforts have been made to toughen epoxies. For example, amorphous materials with high-temperature resistance such as functionalized poly(aryl ether sulfone)s (PAES) have been used as excellent alternatives of rubbers to toughen multifunctional epoxy resins for applications such as notably, military and civilian aircraft exterior and interior parts, automotive, rail, wind power generation, pressure vessels, motor cases, oil well lining tubes, power transmission tubes, printed circuit boards, and molding compounds.

For example, EP 0486044 A2 demonstrates damage resistance of resin compositions made with epoxy resins toughened by addition of thermoplastic or reactive aromatic oligomer. The examples are in particular related to epoxy resin formulations made from VICTREX® 5003P polyethersulfone or from an amine-terminated polyethersulfone oligomer.

US 2005/0038170 A1 discloses molding compositions comprising epoxy resins and poly(aryl ether sulfone)s containing side or end groups selected from the group consisting of carboxy and anhydride groups. Said molding compositions have improved transparency.

JP 3068896B describes epoxy resin compositions comprising a polyfunctional epoxy compound, a phenolic novolak resin, an inorganic filler, in particular crystalline silica powder, a cure accelerator, in particular 2-methylimidazole and a polyethersulfone having terminal amine groups or terminal phenol groups.

Functionalized poly(aryl ether sulfone)s, featuring reactive end groups are known to possess a high solubility and having improved interfacial properties in epoxy resins. High molecular weight functionalized PAES have been used in the past as epoxies toughener because of their particular effectiveness. However, the viscosity of high molecular weight functionalized PAES toughened epoxy resin mixture prior to curing is also much higher compared to said lower molecular weight PAES toughened epoxy resin mixture, thereby suffering from some drawbacks such a less effective working and curing characteristics of said epoxy resin mixtures. For example, high resin viscosity makes it more difficult to wet the carbon fiber matrix to make notably pre-impregnated materials (prepregs) which are used to form composite parts.

There is thus a need of new poly(aryl ether sulfone)s toughened epoxy resin compositions which can overcome all these drawbacks, mentioned above, and exhibit all the beneficial performance properties, such as high temperature performance, solvent resistance, dimensional stability, and high compressive strength of the high molecular weight PAES toughened epoxy resins while maintaining acceptable low resin viscosity and good processability (e.g. good curability). Said epoxy resin compositions can then efficiently be added to fiber or fabric reinforcement to provide prepregs which can then be molded and cured using autoclave or out-of-autoclave processes to form composite parts and laminates, such as aerospace composite parts, having high strength, improved damage tolerance and improved toughness, in particular fracture toughness. Said epoxy resin compositions can then suitably be used in wet resin processes such as resin transfer molding (RTM), vacuum assisted RTM (VARTM), vacuum bag curing, press molding, Seeman Composite resin infusion (SCRIMP™), Quickstep™, resin infusion under flexible tooling (RIFT), filament winding, pultrusion, and thermal expansion molding.

SUMMARY OF INVENTION

The Applicant has now found surprisingly certain functionalized poly(aryl ether sulfone)s toughened epoxy resin compositions which can solve above mentioned problems and have particular good processability which advantageously provide composite parts having high strength, improved damage tolerance and improved toughness, in particular fracture toughness.

It is thus an object of the present invention an epoxy resin composition [composition (C)] comprising:
(i) from 30 to 90% by weight of at least one epoxy compound [compound E], based on the total weight of the composition (C);
(ii) from 0 to 60% by weight of at least one curing agent [agent C], based on the total weight of the composition (C);
(iii) from 0 to 15% by weight of at least one accelerator, based on the total weight of the composition (C);
(iv) from 1 to 60% by weight of at least one poly(aryl ether sulfone) (I) [PAES (I-1)], based on the total weight of the composition (C) and wherein said PAES (I-1) polymer comprises amine functional groups in an amount equal to or more than 200 µeq/g;
(v) from 1 to 60% by weight of at least one poly(aryl ether sulfone) (I) [PAES (I-2)], based on the total weight of the composition (C), and wherein said PAES (I-2) polymer is different from the PAES (I-1) polymer.

Compound E

Compounds E are generally compounds with terminal, and/or internal incorporated epoxy groups.

The compounds E of the present invention have advantageously at least two epoxy groups, preferably two to six epoxy groups. The epoxy compounds having 2 to 4 epoxy groups are particularly preferred. Said epoxy compounds may be in any solid, semi-solid or liquid form.

The terms of epoxy (or epoxide), 1,2-epoxy (or epoxide), vicinal epoxy (or epoxide) and oxirane group are also art recognized terms for this epoxy group.

Suitable compounds E may be saturated, unsaturated, cycloaliphatic, alicyclic or heterocyclic. Particularly suitable epoxy compounds are for example based on reaction products of polyfunctional alcohols, phenols, cycloaliphatic carboxylic acids, aromatic amines, or aminophenols with epichlorohydrin, or else cycloaliphatic epoxides or cycloaliphatic epoxyesters. It is also possible to use a mixture of various compounds E.

Specifically, among the compounds E that may be suitable for the purposes of this invention are resorcinol diglycidyl ether; diglycidyl ether of bisphenol A (or 2,2-bis[p-(2,3-epoxy-propoxy)phenyl]-propane), diglycidyl ether of bromobisphenol A (or 2,2-bis[4-(2,3-epoxypropoxy)-3-bromophenyl]propane; diglycidylether of bisphenol F (or 2,2-bis[p-(2,3-epoxy-propoxy)phenyl]methane), triglycidyl ether of p-aminophenol (or 4-(2,3-epoxypropoxy)-N,N-bis(2,3-epoxy-propyl)aniline), triglycidyl ether of meta-aminophenol (or 3-(2,3-epoxypropoxy)N,N-bis(2,3-epoxypropyl)aniline); triglycidylether of tris(4-hydroxyphenyl)methane, tetraglycidyl methylene dianiline (or N,N,N'-tetra-tetra(2,3-epoxypropyl) 4,4'-diamino-diphenyl methane), tetraglycidyl ether of tetra(4-hydroxy phenyl)ethane, polyglycidyl ethers of phenol-formaldehyde novalac, polyglycidyl ether of orthocresol-novalac, polyglycidyl ethers of polymeric novalacs, cycloaliphatic epoxides and epoxide esters and any combination thereof. More preferably, compound E is chosen among triglycidyl ether of p-aminophenol (or 4-(2,3-epoxypropoxy)-N,N-bis(2,3-epoxy-propyl)aniline), triglycidyl ether of meta-aminophenol (or 3-(2,3-epoxypropoxy) N,N-bis(2,3-epoxypropyl)aniline) and triglycidylether of tris(4-hydroxyphenyl)methane. Particular preferred compound E is triglycidyl ether of para-aminophenol.

The weight percent of the compound E in the composition (C) is generally of at least 30 wt. %, preferably of at least 40 wt. %, more preferably of at least 50 wt. %, and most preferably of at least 60 wt. %, based on the total weight of the composition (C). It is further understood that the weight percent of the compound E in the composition (C) will generally be of at most 90 wt. %, preferably of at most 80 wt. %, more preferably of at most 75 and most preferably of at most 70 wt. %, based on the total weight of the composition (C).

Excellent results were obtained when the composition (C) comprised the compound E in an amount of 40-80 wt. %, more preferably from 50-70 wt. % based on the total weight of the composition (C).

Agent C

For the purposes of the present invention, the term "curing agent" includes any substance which may be used specifically for facilitating or controlling the curing reaction.

In one preferred embodiment of the invention, the agent C of the composition C is an aromatic diamine hardener, more preferably is a compound of the formula

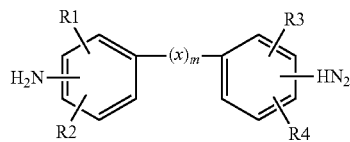

where $R_1$, $R_2$, $R_3$ and $R_4$ are independently hydrogen, halogen or an alkyl or alkoxy group with 1 to 12 carbon atoms and X is O, S, $SO_2$, alkylene, alkylidene, and oxoalkylene and m is 0 or 1, a phenylene diamine or a heterocyclic diamine.

A particularly preferred aromatic diamine is 4,4'-diaminodiphenylsulfone. Other aromatic diamines include 3,3'-diaminodiphenylsulfone; a diaminodiphenyl sulfide; a methylenedianiline such as 4,4'-methylene-dianiline; a diaminodiphenylether; a diaminobenzophenone; benzidine; 4,4'-thiodianiline; -4-methoxy-6-m-phenylenediamine; 2,6-diaminopyridine; 2,4-toluenediamine; 4,4'-[1,4-phenylene (1-methylethylidene)]bis(benzeneamine); 4,4'-[1,4-phenylene(1-methylethylidene]bis(2,6-dimethylbenzenamine), and dianisidine.

In another embodiment of the invention, the agent C of the invention is an aliphatic amine hardener, such as notably aliphatic amine, alicyclic amine and aliphatic aromatic amine hardners. Non limitative examples of alphatic amine hardners are notably diethylenetriamine, triethylenetetramine, tetraethylenepentamine, diproprenediamine, N,N-diethyltrimethylenediamine, and the like. Non limitative examples of alicyclic amine hardners are notably N-aminoethylpiperazine, menthane diamine, isophoronediamine and the like.

Non limitative examples of aliphatic aromatic amine hardners are notably m-xylenediamine and derivatives thereof.

In another embodiment of the invention, the agent C of the composition C is a mixture of an aromatic diamine hardener, as described above and aliphatic amine hardener, as described above.

In another embodiment of the invention, the agent C of the composition C is a non-amine type curing agent such as notably anhydrides, such as carboxylic acid anhydride, tetrahydrophthalic anhydride, methyl-tetrahydrophthalic anhydride, nadicmethylanhydride, phthalic anhydride, maleic anhydride, polyazilicpolyanhydride, trimellitic anhydride, benzophenone tetracarboxylic dianhydride, pyromellitic anhydride and the like; the glycol adducts of said anhydrides and phenol-containing compounds such as nonyl phenol and the like.

When present the weight percent of the agent C in the composition (C) is generally of at least 5 wt. %, preferably of at least 10 wt. %, more preferably of at least 20 wt. %, and most preferably of at least 25 wt. %, based on the total weight of the composition (C). It is further understood that the weight percent of the agent C in the composition (C) will most preferably be of at most 50 wt. %, based on the total weight of the composition (C).

Excellent results were obtained when the composition (C) comprised the agent C in an amount of 10-60 wt. % and more preferably of 25-50 wt. %, based on the total weight of the composition (C).

Accelerator

For the purposes of the present invention, the term "accelerator" includes any substance which may be used specifically for influencing the hardening process, for example accelerating the hardening process.

Examples of accelerators which may be used in the composition (C) are notably Lewis acid:amine complexes such as $BF_3$:monoethylamine, $BF_3$:triethanolamine, $BF_3$: piperidine and $BF^3$:2-methylimidazole; amines such as imidazole, 1-methylimidazole, 2-methylimidazole, 2-ethyl,4-methylimidazole, N,N-dimethylbenzylamine, and other tertiary amines; acid salts of tertiary amines such as the p-toluene sulfonic acid salts of imidazoles or morpholine; salicylic acid salts of imidazoles or benzyldimethylamine; dicyandiamide; 1,1-dimethyl-3-phenyl urea or other substituted ureas such as monuron, diuron, or phenuro; substituted imidazoles; trifluoromethanesulfonic acid salts; carbamides such as toluene-2,4-bis-(N,N-dimethyl carbamide); guanidines such as di-ortho-tolyl guanidine, diphenyl guanidine, tetramethylguanidine; hydroxyl-containing compounds such as bisphenols A, F, or S, catechol, dihydroxynaphthalene, hydroquinone, of tetrabromobisphenol A; and organophosphonium halides and other substances, notably described by way of example in H. Lee, K. Neville, Handbook of Epoxy Resins, McGraw-Hill Book Company, New York, San Francisco, Toronto, 1967.

When present the weight percent of the accelerator in the composition (C) is generally of at least 1 wt. %, preferably of at least 2 wt. % and more preferably of at least 4 wt. %, based on the total weight of the composition (C). It is further understood that the weight percent of the accelerator in the composition (C) will generally be of at most 10 wt. %, preferably of at most 8 wt. % and most preferably of at most 5 wt. %, based on the total weight of the composition (C).

Excellent results were obtained when the composition (C) comprised the accelerator in an amount of 1-5 wt. % based on the total weight of the composition (C).

Poly(aryl ether sulfone) Polymers

The Applicant has surprisingly found that combining PAES (I-1) polymers with PAES (I-2) polymers, as mentioned above, are effective in providing epoxy resin compositions possessing enhanced processability, with no impact on mechanical properties, such as strength, damage tolerance and toughness, in particular fracture toughness of articles made therefrom.

PAES (I-1) and PAES (I-2) are poly(aryl ether sulfone) polymers (PAES), that is to say that all features described here below for polymers (PAES) apply both but independently to PAES (I-1) and PAES (I-2).

For the purpose of the present invention, the term "poly(aryl ether sulfone) polymers (PAES)" is intended to denote any polymer of which more than 50 wt. % of the recurring units are recurring units (R) of one or more formulae containing at least one arylene group, at least one ether group (—O—) and at least one sulfone group [—S(=O)$_2$—].

In the polymer (PAES) as above detailed preferably more than 60%, more preferably more than 80%, still more preferably more than 90% moles of the recurring units are recurring units (R), as above detailed.

Still, it is generally preferred that substantially all recurring units of polymer (PAES) are recurring units (R), as above detailed; chain defects, or very minor amounts of other units might be present, being understood that these latter do not substantially modify the properties of polymer (PAES).

The arylene group of the polymer (PAES) may be aromatic radicals comprising from 6 to 36 carbon atoms, which is optionally substituted by at least one substituent selected from the group consisting of halogen, alkyl, alkenyl, alkynyl, aryl, arylalkyl, nitro, cyano, alkoxy, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium.

The recurring units (R) are advantageously recurring units of formula (A) as shown below:

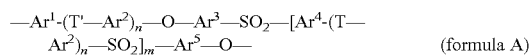

(formula A)

wherein:

Ar$^1$, Ar$^2$, Ar$^3$, Ar$^4$, and Ar$^5$, equal to or different from each other and at each occurrence, are independently an aromatic mono- or polynuclear group;

T and T', equal to or different from each other and at each occurrence, is independently a bond or a divalent group optionally comprising one or more than one heteroatom;

n and m, equal to or different from each other, are independently zero or an integer of 1 to 5;

Preferably, Ar$^1$, Ar$^2$, Ar$^3$, Ar$^4$, Ar$^5$ are equal or different from each other and are aromatic moieties preferably selected from the group consisting of those complying with following formulae:

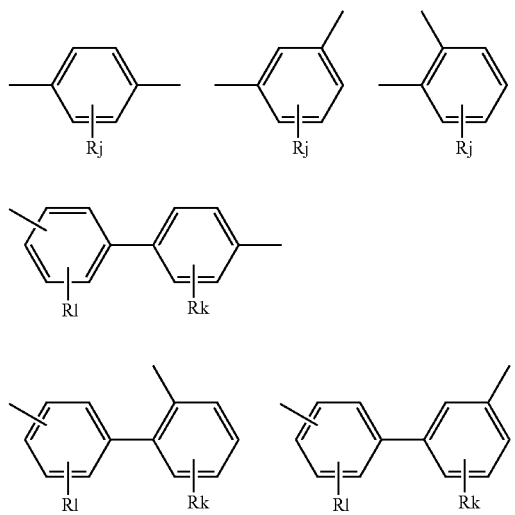

wherein R is selected from the group consisting of:

hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and j, k and l equal or different from each other, are independently 0, 1, 2, 3 or 4.

Ar$^2$ may further be selected from the group consisting of fused benzenic rings such as naphthylenes (and in particular 2,6-naphthylene), anthrylenes (and in particular 2,6-anthrylene) and phenanthrylenes (and in particular 2,7-phenanthrylene), naphthacenylenes and pyrenylenes groups; an aromatic carbocyclic system comprising from 5 to 24 atoms, at least one of which is a heteroatom, such as pyridines, benzimidazoles, quinolines, etc. The hetero atom is often chosen from B, N, O, Si, P and S. It is more often chosen from N, O and S.

Preferably, T and T', equal to or different from each other, is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—; where each R$^a$ and R$^b$, independently of one another, is a hydrogen or a C$_1$-C$_{12}$-alkyl, C$_1$-C$_{12}$-alkoxy, or C$_6$-C$_{18}$-aryl group; —(CH$_2$)$_n$— and —(CF$_2$)$_n$— with n=integer from 1 to 6, or an aliphatic divalent group, linear or branched, of up to 6 carbon atoms; and mixtures thereof.

Recurring units (R) can be notably selected from the group consisting of those of formulae (B) to (E) herein below:

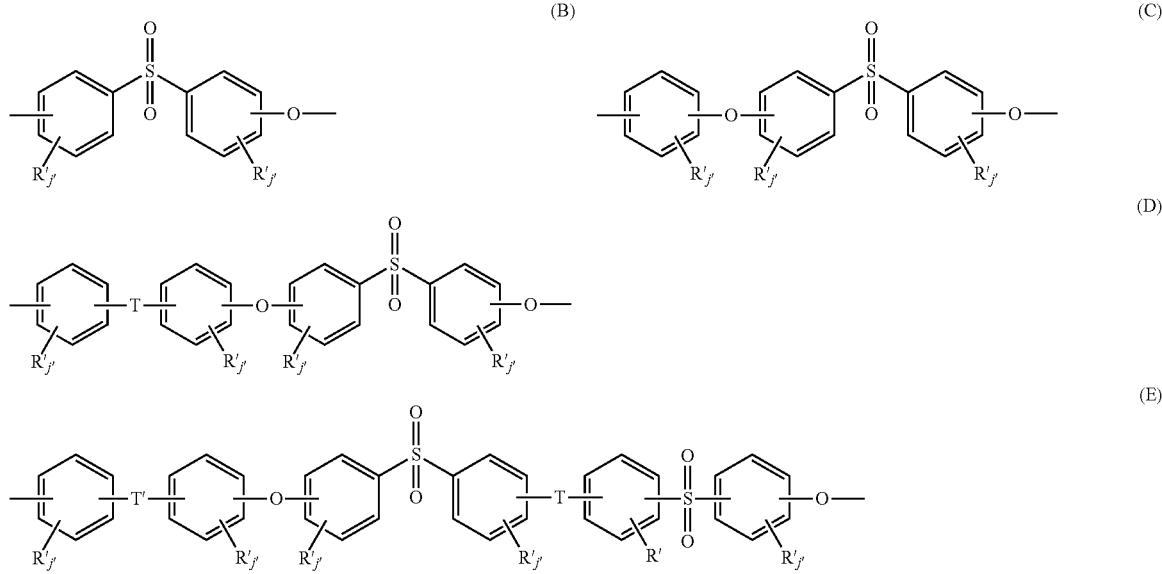

wherein: —each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other, is selected from the group consisting of a bond, —$CH_2$—; —O—; —$SO_2$—; —S—; —C(O)—; —$C(CH_3)_2$—; —$C(CF_3)_2$—; —$C(=CCl_2)$—; —$C(CH_3)(CH_2CH_2COOH)$—; —N=N—; —$R^aC=CR^b$—; where each $R^a$ and $R^b$, independently of one another, is a hydrogen or a $C_1$-$C_{12}$-alkyl, $C_1$-$C_{12}$-alkoxy, or $C_6$-$C_{18}$-aryl group; —$(CH_2)_n$— and —$(CF_2)_n$— with n=integer from 1 to 6, or an aliphatic divalent group, linear or branched, of up to 6 carbon atoms; and mixtures thereof.

As will be detailed later on, the polymer (PAES) may be a poly(biphenyl ether sulfone), such as a polyphenylsulfone. Alternatively, the polymer (PAES) may be a polyethersulfone, a polyetherethersulfone or a bisphenol A polysulfone.

The polymer (PAES) may also be a blend composed of at least two poly(aryl ether sulfone)s chosen from a group consisting of a poly(biphenyl ether sulfone), a polyethersulfone, a polyetherethersulfone or a polysulfone.

For the purpose of the present invention, the poly(biphenyl ether sulfone) is intended to denote any polymer of which more than 50 wt. % of the recurring units are recurring units (R1) of one or more formulae containing at least one ether group (—O—), at least one sulfone group [—S(=O)$_2$—] and at least two groups (G) chosen from phenylene, naphthylenes (such as 2,6-naphthylene), anthrylenes (such as 2,6-anthrylene) and phenanthrylenes (such as 2,7-phenanthrylene), naphthacenylenes and pyrenylenes, each of said groups (G) being joined to at least one group (G) different from itself, directly by at least one single bond and, optionally in addition, by at most one methylene group. Accordingly, groups (G) may thus be joined together to form notably biphenylene groups such as p-biphenylene, 1,2'-binaphthylene groups, triphenylene groups such as p-triphenylene and fluorenylene groups (i.e. divalent groups derived from fluorene).

The recurring units (Ra) are advantageously recurring units of formula (A), as defined above, with the proviso that at least one $Ar^1$ through $Ar^5$ is an aromatic moiety preferably selected from the group consisting of those complying with following formulae:

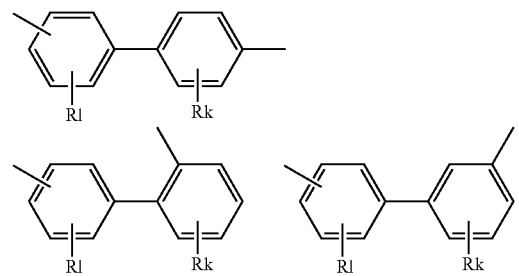

wherein R is selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and k and l equal or different from each other, are independently 0, 1, 2, 3 or 4.

The definitions and preferences described above for T, T', $Ar^1$, $Ar^2$, $Ar^3$, $Ar^4$, $Ar^5$ n and m equally apply here.

More preferably, recurring units (Ra) are chosen from

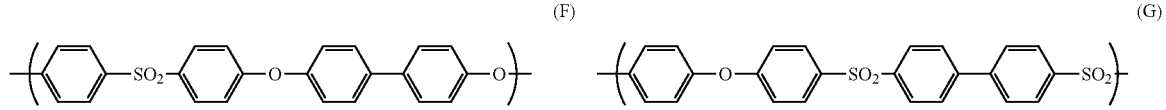

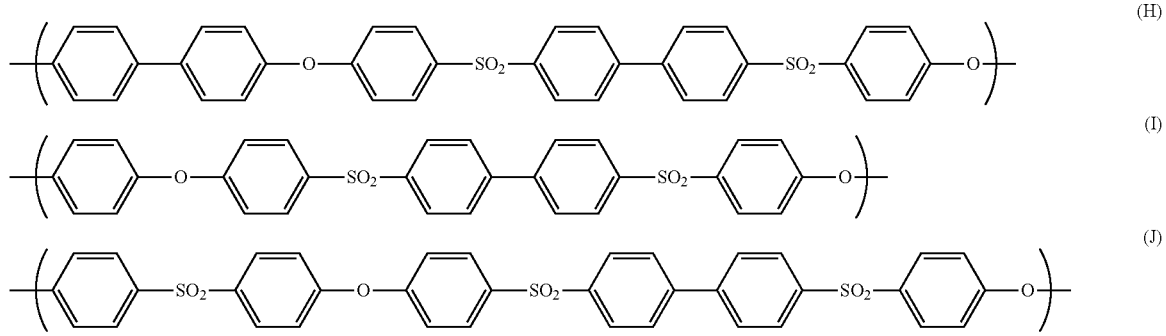

and mixtures thereof.

For the purpose of the present invention, a polyphenylsulfone (PPSU) is intended to denote any polymer of which more than 50 wt. % of the recurring units are recurring units (Ra) of formula (F), while a polyphenylsulfone homopolymer is intended to denote any polymer of which all the recurring units are recurring units (Ra) of formula (F).

Preferably more than 75 wt. %, preferably more than 85 wt. %, preferably more than 95 wt. %, preferably more than 99 wt. % of the recurring units of the poly(biphenyl ether sulfone) are recurring units (Ra). Still more preferably, all the recurring units of the poly(biphenyl ether sulfone) are recurring units (Ra).

In a preferred embodiment of the present invention, more than 75 wt. % more preferably more than 90 wt. %, more preferably more than 99 wt. %, even more preferably all the recurring units of the poly(biphenyl ether sulfone) are of formula (F).

The polyphenylsulfone may be notably a homopolymer, or a copolymer such as a random or a block copolymer. When the polyphenylsulfone is a copolymer, its recurring units are advantageously a mix of recurring units (Ra) of formula (F) and of recurring units (Ra*), different from recurring units (Ra), such as recurrings units of formula (K), (L) or (M) represented hereafter:

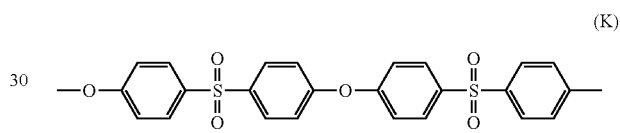

and mixtures thereof.

The polyphenylsulfone can also be a blend of the previously cited homopolymer and copolymer.

RADEL® R PPSU from Solvay Specialty Polymers USA, L.L.C. is an example of a polyphenylsulfone homopolymer.

Poly(biphenyl ether sulfone)s can be prepared by known methods. Methods well known in the art are those described in U.S. Pat. Nos. 3,634,355; 4,008,203; 4,108,837 and 4,175,175, the whole contents of which is herein incorporated by reference.

For the purpose of the present invention, a polyethersulfone is intended to denote any polymer of which more than 50 wt. % of the recurring units are recurring units (Rb) of formula K

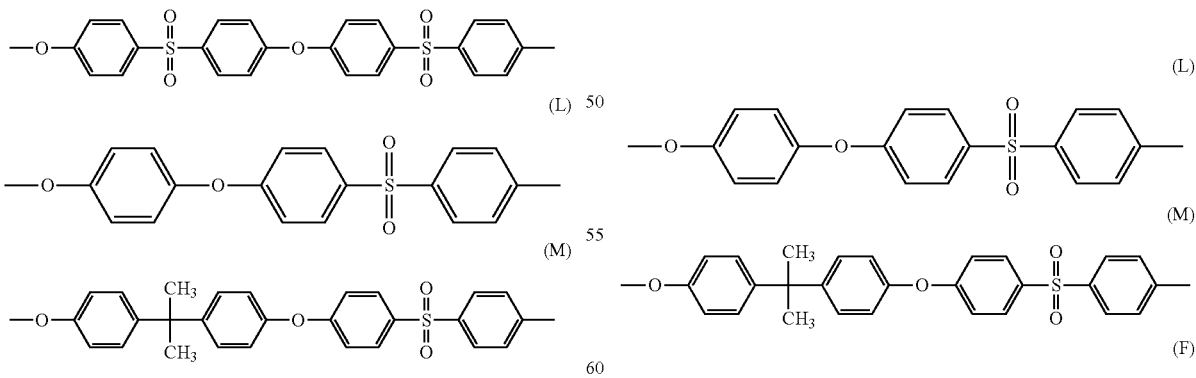

Preferably more than 75 wt. %, preferably more than 85 wt. %, preferably more than 95 wt. %, preferably more than 99 wt. % of the recurring units of the polyethersulfone are recurring units of formula (K). Most preferably all the recurring units of the polyethersulfone are recurring units of formula (K).

The polyethersulfone may be notably a homopolymer, or a copolymer such as a random or a block copolymer. When the polyethersulfone is a copolymer, its recurring units are advantageously a mix of recurring units (Rb) of formula (K) and of recurring units (Rb*), different from recurring units (Rb), such as recurrings units of formula (L), (M) or (F) represented hereafter:

and mixtures thereof.

The polyethersulfone can also be a blend of the previously cited homopolymer and copolymer.

Polyethersulfone is notably available as RADEL® A PES from Solvay Specialty Polymers USA, L.L.C.

Polyethersulfones can be prepared by known methods.

For the purpose of the present invention, a polyetherethersulfone is intended to denote any polymer of which more than 50 wt. % of the recurring units are recurring units (Rc) of formula (L)

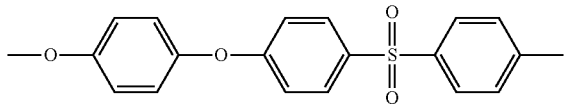
(L)

Preferably more than 75 wt. %, preferably more than 85 wt. %, preferably more than 95 wt. %, preferably more than 99 wt. % of the recurring units of the polyetherethersulfone are recurring units of formula (L). Most preferably all the recurring units of the polyetherethersulfone are recurring units of formula (L).

The polyetherethersulfone may be notably a homopolymer, or a copolymer such as a random or a block copolymer.

When the polyetherethersulfone is a copolymer, its recurring units are advantageously a mix of recurring units (Rc) of formula (L) and of recurring units (Rc*), different from recurring units (Rc), such as recurrings units of formula (K), (M) or (F) represented hereafter:

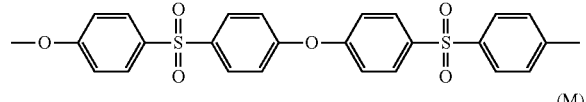
(K)

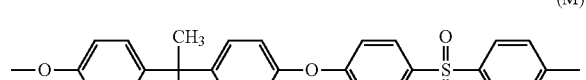
(M)

(F)

and mixtures thereof.

The polyetherethersulfone can also be a blend of the previously cited homopolymer and copolymer.

Polyetherethersulfones can be prepared by known methods.

For the purpose of the present invention, a bisphenol A polysulfone is intended to denote any polymer of which more than 50 wt. % of the recurring units are recurring units (Rd) of formula (M):

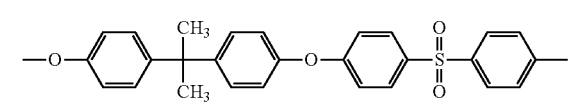
(M)

Preferably more than 75 wt. %, preferably more than 85 wt. %, preferably more than 95 wt. %, preferably more than 99 wt. % of the recurring units of the bisphenol A polysulfone are recurring units of formula (M). Most preferably all the recurring units of the bisphenol A polysulfone are recurring units of formula (M).

The bisphenol A polysulfone may be a homopolymer, or it may be a copolymer such as a random or a block copolymer. When the bisphenol A polysulfone is a copolymer, its recurring units are advantageously a mix of recurring units (Rd) and of recurring units (Rd*), different from recurring units (Rd), such as:

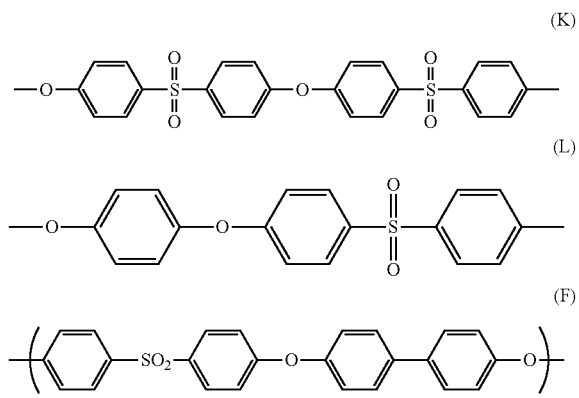

and mixtures thereof.

The Bisphenol A polysulfones can also be a blend of the previously cited homopolymer and copolymer.

The Bisphenol A polysulfones are notably available as UDEL® PSF from Solvay Specialty Polymers USA, L.L.C.

Bisphenol A polysulfones can be prepared by known methods.

The weight average molecular weight ($M_w$) in the polymer (PAES) can be from 2,000 to 60,000 grams per mole (g/mol) as determined by gel permeation chromatography using ASTM D5296 with polystyrene standards.

The glass transition temperature (Tg) of the polymer (PAES) can be from 100 to 300° C. as determined by DSC according to the ASTM 3418 method.

According to a preferred embodiment of the invention, the PAES (I-1) is selected among bisphenol A polysulfones comprising recurring units (Rd), as detailed above.

According to certain preferred embodiments, more than 70% by weight, and more preferably more than 85% by weight of the recurring units of the polymer (PAES (I-1) are recurring units (Rd), as detailed above, the complement to 100% by weight being generally recurring units (Rd*) selected from a group consisting of formula K, formula L and formula F, as detailed above.

Still, it is generally preferred that substantially all recurring units of polymer (PAES (I-1)) are recurring units (Rd), as above detailed; chain defects, or very minor amounts of other units might be present, being understood that these latter do not substantially modify the properties of polymer (PAES (I-1)).

According to the present invention, the PAES (I-1) polymer has advantageously a number of amine functional groups being equal to or less than 800 µeq/g, preferably equal to or less than 700 µeq/g, more preferably equal to or less than 600 µeq/g, even more preferably equal to or less than 550 µeq/g.

According to the present invention, the number of amine functional groups in the PAES (I-1) polymer is equal to or more than 200 µeq/g, preferably in an amount of equal to or more than 250 µeq/g, more preferably in an amount of equal to or more than 300 µeq/g, even more preferably in an amount of equal to or more than 350 µeq/g.

According to the present invention, the PAES (I-1) polymer has advantageously 200-800 µeq/g of amine functional groups, preferably 250-700 µeq/g of amine functional groups, more preferably 300-600 µeq/g of amine functional groups, even more preferably 350-550 µeq/g of amine functional groups.

The PAES (I-1) polymer, as detailed above, may also comprise in addition to amine functional groups various functional groups different from amine functional groups.

For the purpose of the present invention, the functional group may have bonding to atoms of the polymer chain, as a side chain group [side group] or be present as polymer chain end groups [end group].

For the purpose of the present invention, the term "functional group" is intended to denote a group which is able to interact with the compound E and/or the agent C of the composition (C) to promote formation of cross-linking networks through chemical or physical bonding during the curing of the composite and/or to promote the formation of phase-separated PAES- and epoxy-rich domains with proper morphology to impart toughness to the cured epoxy resin.

In the context of the present invention, the functional group can interact with the compound E and/or the agent C of the composition (C) via Van der Waals forces, intermolecular forces (forces between two molecules) such as for example dipole-dipole interactions, dipole-ion interactions, hydrogen bonding and via covalent bonding.

Among these functional groups, mention can notably be made of halogen, in particular chloro; alkoxy, especially methoxy or ethoxy; aryloxy, preferably phenoxy or benzyloxy; hydroxyl, in particular phenol OH; carboxyl (—COOA where A is hydrogen or an alkali metal); anhydride; thiol and epoxide groups. Preferably, the functional groups are selected from a group consisting of hydroxyl, in particular phenol OH, carboxyl (—COOA where A is hydrogen or an alkali metal), anhydride and epoxide groups. The functional group in PAES (I-1) is most preferably a phenol OH group.

In the PAES (I-1) polymer, as detailed above, the amine functional groups and the functional groups different from amine functional groups are present in a ratio of from about 10:1 to about 1:1, preferably from about 5:1 to about 3:1. Excellent results were obtained when the ratio was 4:1.

In another preferred embodiment of the present invention, the functional groups are functional end groups.

In a preferred embodiment, the weight average molecular weight (Mw) of the PAES (I-1) polymer is in the range from 3000 to 40,000 grams per mole (g/mol), more preferably in the range from 5,000 to 30,000 grams per mole (g/mol), most preferably in the range from 10,000 to 20,000 grams per mole (g/mol).

The PAES (I-1) polymer may have glass transition temperatures (Tg) of 180 to 270° C.

According to a preferred embodiment of the invention, the PAES (I-2) is selected among polyethersulfones comprising recurring units (Rb), as detailed above.

According to certain preferred embodiments, more than 70% by weight, and more preferably more than 85% by weight of the recurring units of the polymer (PAES (I-2)) are recurring units (Rb), as detailed above, the complement to 100% by weight being generally recurring units (Rb*) selected from a group consisting of formula L, formula M and formula F, as detailed above.

Still, it is generally preferred that substantially all recurring units of polymer (PAES (I-2)) are recurring units (Rb), as above detailed; chain defects, or very minor amounts of other units might be present, being understood that these latter do not substantially modify the properties of polymer (PAES (I-2)).

According to the present invention, the polymer PAES (I-2), as detailed above, advantageously comprise various functional groups, as described above, different from amine functional groups.

The functional group in the polymer PAES (I-2) is preferably selected from a group consisting of hydroxyl, in particular phenol OH, carboxyl (—COOA where A is hydrogen or an alkali metal, anhydride and epoxide groups.

The functional group in the PAES (I-2) polymer is most preferably a phenol OH group.

In a preferred embodiment of the present invention, the PAES (I-2) polymer has advantageously a number of phenol OH groups being equal to or less than 300 µeq/g, preferably equal to or less than 200 µeq/g, more preferably equal to or less than 150 µeq/g, even more preferably equal to or less than 100 µeq/g.

In a preferred embodiment of the present invention, the PAES (I-2) polymer has advantageously a number of phenol OH groups being equal to or more than 10 µeq/g, preferably equal to or more than 20 µeq/g, more preferably equal to or more than 30 µeq/g, even more preferably equal to or less more than 50 µeq/g.

If desired, the polymer PAES (I-2) can further comprise amine functional groups in an amount of less than 200 µeq/g, preferably less than 150 µeq/g, more preferably less than 100 µeq/g, even more preferably less than 50 µeq/g.

In a preferred embodiment, the weight average molecular weight (Mw) of the PAES (I-2) polymer is in the range from 10,000 to 55,000 grams per mole (g/mol), more preferably in the range from 20,000 to 50,000 grams per mole (g/mol), even more preferably in the range from 30,000 to 48,000 grams per mole (g/mol).

The PAES (I-2) polymer may have glass transition temperatures (Tg) of 100 to 220° C.

Analytical methods can be used for the determination of the total number of functional groups in said PAES (I-1) and PAES (I-2) polymers, including notably titration methods, spectroscopic measurements such as IR and NMR or radioactive measurements such as for polymers with labeled end-groups.

Preferably, the total number of amine functional groups in the PAES (I-1) polymer and total number of phenol OH groups in the PAES (I-1) and PAES (I-2) polymers of the present invention are suitably determined by a titration method, preferably a potentiometric titration method.

The PAES (I-1) and PAES (I-2) polymers are generally dissolved in a solvent suitable for titration. Non limitative examples of solvents and solvent blends suitable to use in the titration of the PAES (I-1) polymer of the present invention for the determination of the total number of amine functional groups are for example chlorobenzene, sulfolane, dichloromethane and mixtures thereof.

For the determination of the total number of amine functional groups, an acid is suitably used as titrant. Suitable acids are in general those having a $K_a$ value equal to or at least 1000 times greater than the $K_a$ value of the protonated amine end group. Non limitative examples of suitable acids are notably perchloric acid in glacial acetic acid.

For the determination of the total number of phenol OH groups, a base is suitably used as titrant. Suitable bases are in general those having a $K_b$ value equal to of at least 1000 times greater than the $K_b$ value of the de-protonated carboxyl end group. A suitable bases is notably tetrabutylammonium hydroxide in a mixture of toluene and methanol.

The base is in general dissolved in an organic solvent. The organic solvent to be used may, for example, be toluene, dimethyl formamide, dimethyl acetamide, dimethylsulfoxide, sulfolane, tetrahydrofuran, acetonitrile, dioxane, methanol, ethanol and mixture thereof.

The weight percent of the PAES (I-1) polymer in the composition (C) is generally of at least 5 wt. %, preferably of at least 10 wt. %, and more preferably of at least 15 wt. %, based on the total weight of the composition (C). It is further understood that the weight percent of the PAES (I-1) polymer in the composition (C) will generally be of at most 50 wt. %, preferably of at most 40 wt. %, more preferably of at most 35 wt. %, most preferably of at most 25 wt. % based on the total weight of the composition (C).

Excellent results were obtained when the composition (C) comprised the PAES (I-1) polymer in an amount of 5-50 wt. %, preferably of 10-40 wt. %, more preferably of 15-25 wt. %, based on the total weight of the composition (C).

The weight percent of the PAES (I-2) polymer in the composition (C) is generally of at least 5 wt. %, preferably of at least 10 wt. %, and more preferably of at least 15 wt. %, based on the total weight of the composition (C). It is further understood that the weight percent of the PAES (I-2) polymer in the composition (C) will generally be of at most 50 wt. %, preferably of at most 40 wt. %, more preferably of at most 35 wt. %, most preferably of at most 25 wt. % based on the total weight of the composition (C).

Excellent results were obtained when the composition (C) comprised the PAES (I-2) polymer in an amount of 5-50 wt. %, preferably of 10-40 wt. %, more preferably of 15-25 wt. %, based on the total weight of the composition (C).

The weight of the PAES (I-2) polymer, based on the total weight of the PAES (I-2) polymer and the PAES (I-1) polymer, is advantageously above 10%, preferably above 20%, more preferably above 30% and still more preferably above 40%. On the other hand, the weight of the PAES (I-2) polymer, based on the total weight of the PAES (I-2) polymer and the PAES (I-1) polymer, is advantageously below 90%, preferably below 80%, is more preferably below 70% and still more preferably below 60%.

Non limitative examples of commercially available PAES (I-1) polymers suitable for the invention include the VIRANTAGE® VW-30500 RP PAES commercially available from Solvay Specialty Polymers USA, L.L.C., which is a polymer, the recurring units of which are recurring units (Rd), as above detailed.

Non limitative examples of commercially available PAES (I-2) polymers suitable for the invention include the VIRANTAGE® VW-10200 RFP commercially available from Solvay Specialty Polymers USA, L.L.C., which is a polymer, the recurring units of which are recurring units (Rb), as detailed above.

A preferred composition of the invention thus includes a PAES (I-1) polymer, as detailed above, comprising recurring units (Rd) of formula (M), a number of amine functional groups being equal to or more than 200 µeq/g and equal to or less than 550 µeq/g and having a weight average molecular weight (Mw) in the range from 10,000 to 20,000 grams per mole (g/mol) and a PAES (I-2) polymer, as detailed above, comprising recurring units (Rd) of formula (K), a number of functional groups being equal to or less than 100 µeq/g and having a weight average molecular weight (Mw) in the range from 30,000 to 48,000 grams per mole (g/mol).

Optionally, the polymer composition of the invention can further comprise conventional other ingredients of polymeric compositions such as notably fillers, reinforcing agents, lubricating agents, flow modifiers, heat stabilizer, anti-static agents, extenders, reinforcing agents, processing aids, plasticizers, dyes, organic and/or inorganic pigments like $TiO_2$, carbon black, antioxidants, flame retardants, oxidation retarders, rubbers, agents to counteract decomposition by heat or decomposition by ultraviolet light, and the like.

The composition of the invention can advantageously comprise at least one filler chosen from reinforcing fillers, structural fibers and mixtures thereof. Structural fibers may include glass fiber, carbon or graphite fibers, and fibers formed of silicon carbide, alumina, titania, boron and the like, and may include mixtures comprising two or more such fibers. Reinforcing fillers which can also be used in the composition of the invention include notably pigments, flake, spherical and fibrous particulate filler reinforcements and nucleating agents such as talc, mica, titanium dioxide, potassium titanate, silica, kaolin, chalk, alumina, mineral fillers, and the like. The reinforcing fillers and structural fibers can be used alone or in any combination. The structural fibers can be in a woven, non-woven, non-crimped, unidirectional or multiaxial textiles or chopped form.

Another aspect of the present invention concerns a process for manufacturing the epoxy resin composition (C) as described above, which comprises mixing:

at least one component E, as detailed above;
at least one PAES (I-1) polymer, as detailed above;
at least one PAES (I-2) polymer, as detailed above;
optionally, at least one curing agent C, as detailed above; and
optionally, at least one accelerator, as detailed above;

Advantageously, the process of the invention comprises admixing of the compound E, the polymer materials and where appropriate the curing agent C, the accelerator, and any optional other ingredient, as detailed above, desired in the composition, by solution mixing, melt mixing or a combination of dry blending and melt mixing.

The sequence of mixing the components may be as desired. For example, a first step may mix the PAES (I-1) and PAES (I-2) polymers and, where appropriate, any optional ingredient with as yet still at least partially unreacted components E, and, where appropriate, agent C, and/or the accelerator, and a second step may completely harden components E and, where appropriate, agent C, and/or the accelerator. The sequence of mixing components E and, where appropriate, agent C, and/or the accelerator with the PAES (I-1) and PAES (I-2) polymers and, where appropriate, any optional other ingredient may be varied, and therefore two or, where appropriate, three or more components may be premixed, or else all of the components may be mixed together.

Preferably, the components of the composition (C) are mixed by solution mixing. The solution mixing can be carried out following standard methods. Typically, liquid components can be added together with stirring and/or a solid component can be dissolved in a liquid component.

In a specific aspect of the present invention, at least one component E, as detailed above; at least one PAES (I-1) polymer, as detailed above and at least one PAES (I-2) polymer, as detailed above are mixed by solution mixing according to known methods to form a curable composition [composition (CU)].

The composition (CU) of the present invention has a solution viscosity as measured using a test method, described in detail below, advantageously below 90, preferably below 70, more preferably below 50, even more preferably below 40 and most preferably below 35 Pa·s.

Typically the composition (CU) of the present invention has a solution viscosity as measured using a test method, described in detail below, of at least 0.1 Pa·s, generally of at least 0.5 Pa·s, more preferably at least 1 Pa·s, preferably at least 2 Pa·s.

The solution viscosity of the composition (CU) according to the present invention was measured according to following test method [solution viscosity test method].

A test solution is prepared in a jar by adding 20.00±0.02 g triglycidyl p-aminophenol (TGAP) liquid to a total of 5.00 g of the PAES (I-2) polymer and the PAES (I-1) polymer, in powder form and oven-dried. The jar is placed in an oil bath controlled at 130° C. and the mixture stirred vigorously with a glass rod until a homogeneous mixture is observed (15-30 minutes). Next, the open jar is placed in a vacuum oven at 90° C. for one hour to degas the yellow-brown clear solution. The viscosity of the test solution obtained is measured using a Haake VT-500 viscometer with the HV-1 spindle and cup. The temperature is controlled at 60.0±0.1° C. using a Yamato Thermoelite Model BH-71 temperature controlled water bath. A portion of the warm test solution is poured in to the HV-1 cup until the cavity is filled and then the spindle is pushed in to the cavity and solution so that a small amount of the solution completely covers the measuring volume. The spindle and cup are attached to the VT-500 viscometer and the sample is equilibrated at 60.0° C. for 15 minutes. The viscometer is zeroed and the spindle turns at speeds to give torque readings between 0.10 and 2 N-cm which was the range of this instrument. The torque readings ($M_d$, N-cm) are recorded at various speed settings (n). The viscosity ($\eta$, Pa·s) was calculated using the equations below and the shape factors (f and M) for the HV-1 spindle and cup supplied in the Haake VT-500 manual.

Shear stress ($\tau$)=$M_d$×f/10 (Pa)
Shear rate (D)=n×M/1000 (1/s)
Viscosity ($\eta$)=$\tau$/D (Pa·s)
Where f=25275 and M=1290 for the HV-1 rotor and cup (from the manual).

Another aspect of the present invention concerns a process for the manufacturing of a cured compound from the composition (C) as described above, which comprises mixing and heating of at least one component E, as detailed above; at least one PAES (I-1) polymer, as detailed above; at least one PAES (I-2) polymer, as detailed above; at least one curing agent C, as detailed above; optionally, at least one accelerator, as detailed above and optionally at least one other ingredient, as detailed above.

It is understood that the mixing can be carried out as described above.

In one embodiment of the process of the invention, first a preliminary reaction is carried out between the compound E, the PAES (I-1) and PAES (I-2) polymers and any optional ingredient, as detailed above, if desired, initially only a portion of the entire amount of the compound E is used. This preliminary reaction is preferably carried out at from 80° C. to 140° C. and in general takes from 30 to 360 minutes but may also take 24 h, for example. The agent C and/or the accelerator and, where appropriate, the remainder of the compound E may then be added and the hardening reaction initiated, to form a cured compound. This reaction may proceed at from 100 to 240° C., for example.

Another aspect of the present invention concerns a cured compound made by processing the composition (C) of the present invention, as described above.

The cured compound according to the present invention has advantageously a fracture toughness of at least 1.00 MPa·m$^{1/2}$, preferably of at least 1.10 MPa·m$^{1/2}$, more preferably of at least 1.15 MPa·m$^{1/2}$, most preferably of at least 1.20 MPa·m$^{1/2}$.

The fracture toughness can be measured according to ASTM D5045.

In one specific embodiment of the process of the invention, the composition (C) of the present invention is further processed by following standard composite processes such as notably resin transfer molding (RTM), continuous resin transfer molding (CRTM), vacuum assisted RTM (VARTM), vacuum assisted injection moulding (VAIM), vacuum assisted processing, vacuum infusion moulding (VIM), vacuum bag curing, press molding, Seeman Composite resin infusion (SCRIMP™), Quickstep™, resin film infusion (RFI), resin infusion under flexible tooling (RIFT), automated fiber placement, filament winding, pultrusion, thermal expansion molding and the like, to form the cured compound.

In another specific embodiment of the invention, the epoxy resin composition of the present invention can also be efficiently added to fiber or fabric reinforcement to provide prepregs thereby using conventional techniques. The fibers of the fiber reinforcement can comprise a variety of different materials including glass fibers, carbon fibers, polyamide fibers such as poly(p-phenylene terephthalamide) fibers and ceramic fibers. Carbon fibers are typically used as the reinforcing fiber in advanced aerospace structural composites. The fiber reinforcement may comprise a variety of configurations. For example, the fiber reinforcement may comprise a woven structure constructed by interlacing yarns, fibers or filaments to form patterns such as plain, harness satin or leno weaves.

Alternatively, the fiber reinforcement may comprise a nonwoven structure or planar textile structure produced by loosely compressing together fibers, yarns, and the like. The fiber reinforcement may also comprise a tow (i.e., an untwisted bundle of continuous fibers) or a roving (i.e., a number of yarns, strands, tows or ends collected into a parallel bundle with little or no twist).

Said prepregs can then be molded and cured using autoclave or out-of-autoclave processes to form composite parts and laminates, such as aerospace composite parts, having high strength, improved damage tolerance and improved toughness, in particular fracture toughness.

An aspect of the present invention also provides an article comprising at least one component comprising the cured compound, as detailed above, which provides various advantages over prior art parts and articles, in particular improved strength, damage tolerance, toughness, in particular fracture toughness and dimensional stability. Preferably, the article or part of the article consists of the cured compound as detailed above. Advantageously, the article is an aircraft structural component, a secondary aircraft component, an automotive structural component, an oil well lining tubes, a power transmission tube, a printed circuit board, a rail component, a wind power generation component. The articles according to the invention can be fabricated by processing the composition as above described following the standard composite processes.

Should the disclosure of any patents, patent applications, and publications which are incorporated herein by reference conflict with the description of the present application to the extent that it may render a term unclear, the present description shall take precedence.

The invention will be now described in more details with reference to the following examples, whose purpose is merely illustrative and not intended to limit the scope of the invention.

The following commercially available materials were used:

VIRANTAGE® VW-10200 RFP, commercially available from Solvay Specialty Polymers USA, L.L.C. (resin #1, hereafter) having 80 μeq/g phenol OH end groups and a $M_w$=43,200 g/moles, VIRANTAGE® VW-10700 RSFP, commercially available from Solvay Specialty Polymers USA, L.L.C. (resin #2, hereafter) having 215 μeq/g phenol OH end groups and a $M_w$=19,200 g/mole, VIRANTAGE® VW-30500 RP, commercially available from Solvay Specialty Polymers USA, L.L.C. (resin #3, hereafter), having 401 μeq/g amino end groups and 100 μeq/g phenol OH end groups.

The weight-average molecular weight ($M_w$) was 13,714 g/mole.

Triglycidyl p-aminophenol (TGAP or 4-(2,3-epoxy-propoxy)-N,N-bis(2,3-epoxy-propyl)aniline) supplied by Aldrich Chemical Company.

Determination of the Weight Average Molecular Weight (Mw):

The weight average molecular weight is determined by gel permeation chromatography using ASTM D5296 with polystyrene standards.

Resins used in the examples and comparative examples were characterized by potentiometric titration of amino and phenol OH end groups whereby the polymer samples were dissolved in appropriate solvents (see details below). Titrations were performed at room temperature using a Brinkmann Model 686, 670 or 726 Titroprocessor or equivalent. Temperature variations greater than +/−2° C. were noted. For the amine end group titrations, a Brinkmann combination pH electrode with sleeve junction 6.0219.100 or 6.0255.100 or equivalent was employed. For the phenol OH end group titrations, a Methohm Combination pH electrode, Model 6.0233.100 was used.

Calculations were corrected with titrant volumes determined for the appropriate solvent blank.

Determination of the Concentration of Amine End Groups:

Resin, 1 g, was dissolved in 45 mL dichloromethane at ambient temperature. Acetic acid, 15 mL, was added. The concentration of amino end groups, expressed in μeq/g polymer, was determined by potentiometric titration of this solution with 0.1 N perchloric acid in glacial acetic acid.

Determination of the Concentration of Phenol OH End Groups:

Resin, 0.3 g, was dissolved in 5 mL 50/50 mixture of sulfolane/chlorobenzene at 115° C. The concentration of phenol OH end groups, expressed in μeq/g polymer, was determined by potentiometric titration of this solution with 0.025 N tetrabutylammonium hydroxide in toluene/methanol.

PREPARATIVE EXAMPLE 1

Synthesis of Benzoaxine End Capped Resin #2
(Resin #4, Hereafter)

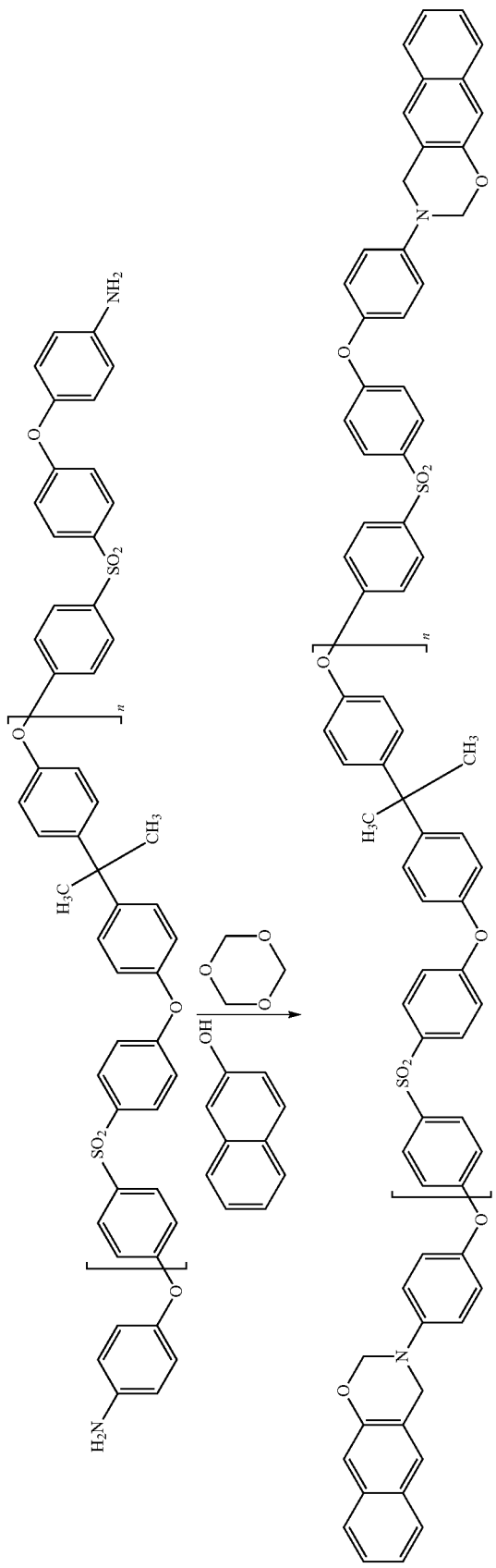

In a 500 ml round bottom flask was placed 13.41 g of amine-terminated polysulfone (B2) along with 60 ml dioxane. The mixture was stirred for five minutes to give a clear, dark solution. Next, 0.28 g paraformaldehyde and 1.25 g β-naphthol were added and the contents warmed to reflux for six hours. The mixture was poured into a Waring blender containing 1 L deionized water at 80° C. and mixed for one minute. The slurry was filtered, the solid washed with methanol and dried in a vacuum oven at 90° C. for fifteen hours. HNMR analysis of the solid in $CDCl_3$ revealed peaks at 5.46 and 4.94 ppm characteristic of the benzoxazine ring.

PREPARATIVE EXAMPLE 2

Synthesis of Dianhydride End Capped Resin #1 (Resin #5, Hereafter)

Into a 250-ml four-neck flask equipped with an overhead stirrer, Dean Stark trap, condenser, nitrogen inlet, and thermocouple, was placed 20.0 g Virantage® VW-10200 RFP, 0.88 g (0.0151 mol) KF, 1.8 g (0.011 mol) 4-fluorophthalic anhydride, and 70 mL 2-methylpyrrolidone. The mixture was stirred and warmed to 180° C. for three hours. The mixture was cooled to 40-80° C., filtered through a glass fiber filter, and poured in to an excess of methanol to form a solid. After filtration, the polymer powder was washed twice with water and then with methanol. The solid was dried under reduced pressure at 130° C. overnight.

PREPARATIVE EXAMPLE 3

Synthesis of a Low Weight Average Molecular Weight Polyethersulfone (Mw 11,400 g/mole) Having Phenol OH Groups (Resin #6, Hereafter)

In a 500 ml 4-neck flask equipped with an overhead stirrer, Dean Stark trap, condenser, nitrogen inlet, and thermocouple, was placed 27.54 g (0.0959 moles) dichlorodiphenylsulfone, 30.00 g (0.1198 moles) bisphenol S, 24.85 g (0.18 moles) potassium carbonate, and 117 g sulfolane. The mixture was warmed under a slight stream of nitrogen to 210° C. and held at that temperature for 24 hours. The mixture was cooled to 50° C. and poured in to acidified methanol to form a white solid. The solid was isolated by filtration, washed with methanol, and dried in a vacuum oven overnight at 130° C.

PREPARATIVE EXAMPLE 4

Synthesis of Dianhydride Endcapped Resin (Resin #7, Hereafter)

Into a 250-ml four-neck flask equipped with an overhead stirrer, Dean Stark trap, condenser, nitrogen inlet, and thermocouple, was placed 10.0 g, of resin #6 of preparative example 3, 0.44 g (0.0075 mol) KF, 0.90 g (0.005 mol) 4-fluorophthalic anhydride, and 70 mL 2-methylpyrrolidone. The mixture was stirred and warmed to 180° C. for three hours. The mixture was cooled to 40-80° C., filtered through a glass fiber filter, and poured in to an excess of methanol to form a solid. After filtration, the polymer powder was washed twice with water and then with methanol. The solid was dried under reduced pressure at 130° C. overnight.

PREPARATIVE EXAMPLE 5

Synthesis of a Medium Weight Average Molecular Weight Polyethersulfone (Mw 24,000 g/mole) Having COOH Groups (Resin #8, Hereafter)

In a 500-ml four-neck flask equipped with an overhead stirrer, Dean Stark trap, condenser, nitrogen inlet, and thermocouple, was placed 29.1 g (0.116 mol) bisphenol S, 2.49 g (0.0181 mol) p-hydroxybenzoic acid, 27.36 g (0.198 mol) $K_2CO_3$, 35.9 g 4,4'-dichlorodiphenylsulfone, and 125 g sulfolane. The reaction mixture was warmed to 210° C. under a slight stream of nitrogen for four hours. The mixture was cooled to about 150° C. and diluted with about 100 ml sulfolane. After further cooling, the mixture was filtered through a glass fiber filter to remove inorganic salts and the resulting solution added to an excess of methanol. The solid was isolated by filtration and washed with warm water twice and finally with methanol. The solid was then dried under reduced pressure at 100° C. overnight.

General Procedure for the Preparation of an Epoxy Resin Composition in Solution

The epoxy resin composition in solution was prepared in an oven-dried 50-mL wide mouth jar by adding 20.00±0.02 g (80 wt. %) triglycidyl p-aminophenol (TGAP) liquid to a total amount of 5.00 g (20 wt. %) of a PAES polymer or a PAES polymer mixture in powder form and oven-dried. The jar was placed in an oil bath controlled at 130° C. and the mixture was stirred for 15-30 minutes vigorously with a glass rod until a homogeneous mixture was observed. Next, the open jar was placed in a vacuum oven at 90° C. for one hour to degas the yellow-brown clear solutions.

Weight fractions of the various resins in the PAES polymer mixture, solution viscosity of the epoxy resin composition in solution is summarized in table 2.

Solution Viscosity Test Method:

The viscosities of the epoxy resin composition solution, as detailed above, were measured using a Haake VT-500 viscometer with the HV-1 spindle and cup. The temperature was controlled at 60.0±0.1° C. using a Yamato Thermoelite Model BH-71 temperature controlled water bath. A portion of the warm epoxy resin composition solutions was poured in to the HV-1 cup until the cavity was filled and then the spindle pushed in to the cavity and solution so that a small amount of the solution completely covered the measuring volume. The spindle and cup were attached to the VT-500 viscometer and the sample was equilibrated at 60.0° C. for 15 minutes. The viscometer was zeroed and the spindle turned at speeds to give torque readings between 0.10 and 2 N-cm which was the range of this instrument. The torque readings ($M_d$, N-cm) were recorded at various speed settings (n). The viscosity (η, Pa·s) was calculated using the equations below and the shape factors (f and M) for the HV-1 spindle and cup supplied in the Haake VT-500 manual.

Shear stress (τ)=$M_d$×f/10 (Pa)
Shear rate (D)=n×M/1000 (1/s)
Viscosity (η)=τ/D (Pa·s)
Where f=25275 and M=1290 for the HV-1 rotor and cup.

General Procedure for the Preparation of a Cured Epoxy Resin Composition

In an 8-ounce wide mouth jar was weighed 100 parts (54.4 wt. %) of triglycidyl p-aminophenol (TGAP). Next, 50 g of methylene chloride was added and the mixture stirred for a few minutes at room temperature using a PTFE-coated magnetic stir bar. To this solution was added 40 parts (21.7 wt. %) of a PAES polymer or a PAES polymer mixture in powder over 10 minutes. The mixture was stirred for an additional 15 minutes to give a clear solution. Next, 44 parts (23.9 wt. %) of 4,4'-diaminodiphenylsulfone (DDS) hardener was added and the milky suspension stirred for 30 minutes. The suspension was poured into a 10 cm diameter PTFE dish on a hot plate controlled at 60'C. After one hour, the PTFE dish and the viscous epoxy resin composition mixture was placed in a vacuum oven at 55° C. for 16 hours, and then warmed to 120° C. under vacuum for one hour. The vacuum was released and the mixture heated an additional one hour at 120° C., warmed to 175° C. at ~2° C./min and held at 175° C. for two hours. The clear orange cured sample was cooled slowly to room temperature and removed from the PTFE dish to give a uniform transparent, dark orange disc.

Weight fractions of the various resins in the PAES polymer mixture, plane strain fracture toughness ($K_{IC}$) of the cured epoxy resin composition are summarized in table 2.

Plane Strain Fracture Toughness (KIC) Test Method:

The cured dark orange disc was cut using a band saw to give small rectangles ($40 \times 12 \times 3$ mm$^3$) with carefully measured dimensions for measuring $K_{IC}$ according to ASTM-D5045. Each bar is then machine-notched in the middle and then a small crack started with a razor blade inside the notch. Stress is applied at each end of the bar and the energy needed to propagate the crack is calculated based on measurements of new crack formation. Usually five samples are prepared and measured to get an average $K_{1C}$ in units of MPa·m$^{1/2}$. Variability is typically around 5-10%.

on the total weight of the composition (C), and wherein said PAES (I-2) polymer is different from the PAES (I-1) polymer and the PAES (I-2) polymer is a polyethersulfone of which more than 50% by weight of the recurring units are recurring units according to formula (K):

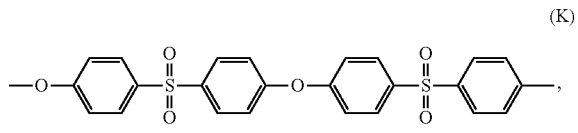

(K)

and the PAES (I-2) polymer comprises phenol OH functional groups in an amount equal to or more than 10 µeq/q.

2. The composition (C) according to claim 1, wherein more than 50% wt of the recurring units of the PAES (I-1) polymer are recurring units (R) according to formula (A):

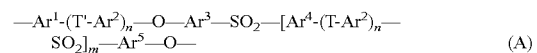

(A)

wherein:

Ar$^1$, Ar$^2$, Ar$^3$, Ar$^4$, and Ar$^5$ are equal to or different from each other and, at each occurrence, independently an aromatic mono- or polynuclear group;

| | Weight fractions of resins in PAES polymer or PAES polymer mixture | | | | | | | | Viscosity* | $K_{IC}$** |
|---|---|---|---|---|---|---|---|---|---|---|
| Examples | #1 | #2 | #3 | #4 | #5 | #6 | #7 | #8 | (η, Pa · s) | (MPa · m$^{1/2}$) |
| C1 | 1.00 | — | | | | | | | 56 | 1.29 ± 0.08 |
| C2 | 0.75 | 0.25 | | | | | | | 41 | 1.14 ± 0.05 |
| C3 | 0.50 | 0.50 | | | | | | | 19.5 | 0.97 ± 0.10 |
| C4 | — | 1.00 | | | | | | | 7.6 | 0.83 ± 0.06 |
| 5 | 0.75 | | 0.25 | | | | | | 26.2 | 1.22 ± 0.08 |
| 6 | 0.50 | | 0.50 | | | | | | 12.8 | 1.21 ± 0.10 |
| C7 | | | 1.00 | | | | | | 2.2 | 0.72 ± 0.06 |
| C8 | 0.50 | | | 0.50 | | | | | 10.9 | 1.02 ± 0.09 |
| C9 | 0.50 | | | | 0.50 | | | | (19.5)$^a$ | 1.12 ± 0.11 |
| C10 | 0.50 | | | | | 0.50 | | | 9.2 | 0.95 ± 0.06 |
| C11 | 0.50 | | | | | | 0.50 | | (9.2)$^a$ | 0.89 ± 0.05 |
| C12 | 0.50 | | | | | | | 0.50 | 11.8 | 1.02 ± 0.07 |

*Under test conditions of 20 wt. % PAES polymer or PAES polymer mixture in TGAP at 60° C., as detailed above
**Plane strain fracture toughness ($K_{IC}$) of the cured epoxy resin composition consisting of TGAP/PAES polymer or PAES polymer mixture/DDS = 54.4/21.7/23.9 wt. %

The invention claimed is:

1. An epoxy resin composition (C), comprising:
   (i) from 30 to 90% by weight of at least one epoxy compound (E), based on the total weight of the composition (C);
   (ii) from 0 to 60% by weight of at least one curing agent, based on the total weight of the composition (C);
   (iii) from 0 to 15% by weight of at least one accelerator, based on the total weight of the composition (C);
   (iv) from 1 to 60% by weight of at least one first poly(aryl ether sulfone) polymer (PAES (I-1)), based on the total weight of the composition (C) and wherein said PAES (I-1) polymer comprises amine functional groups in an amount equal to or more than 200 µeq/g; and
   (v) from 1 to 60% by weight of at least one second poly(aryl ether sulfone) polymer (PAES (I-2)), based T and T' are equal to or different from each other and, at each occurrence, independently a bond or a divalent group and may optionally comprise one or more than one heteroatom; and n and m, equal to or different from each other, are independently zero or an integer of 1 to 5.

3. The composition (C) according to claim 2, wherein recurring units (R) are selected from formulae (B) to (D):

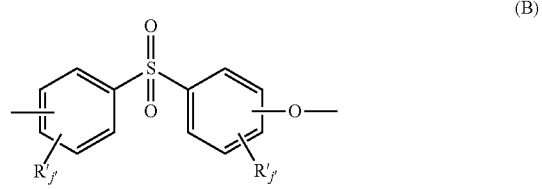

(B)

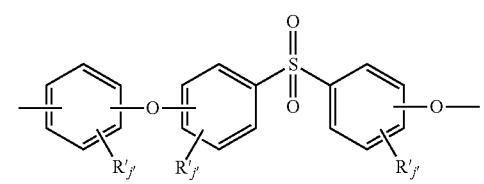

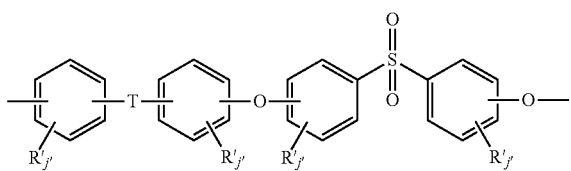

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other, is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—; where each R$^a$ and R$^b$; independently of one another, is a hydrogen or a C$_1$-C$_{12}$-alkyl, C$_1$-C$_{12}$-alkoxy, or C$_6$-C$_{18}$-aryl group; —(CH$_2$)$_n$— and —(CF$_2$)$_n$— with n=integer from 1 to 6, or an aliphatic divalent group, linear or branched, of up to 6 carbon atoms; and mixtures thereof.

4. The composition (C) according to claim 1, wherein the PAES (I-1) polymer is a bisphenol A polysulfone polymer of which more than 50% by weight of the recurring units are recurring units according to formula (M):

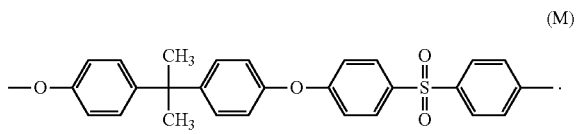

5. The composition (C) according to claim 1, wherein the PAES (I-1) polymer has 200-800 μeq/g of amine functional groups.

6. The composition (C) according to claim 1, wherein the PAES (I-1) polymer further comprises functional groups different from amine functional groups and wherein the amine functional groups and the functional groups different from amine functional groups are present in a ratio of from about 10:1 to about 1:1.

7. The composition (C) according to claim 1, wherein the PAES (I-1) polymer has a weight average molecular weight in the range from 3000 to 40,000 grams per mole and glass transition temperature of 180 to 270° C.

8. The composition (C) according to claim 1, wherein the PAES (I-2) polymer has a weight average molecular weight in the range from 10,000 to 55,000 grams per mole and glass transition temperature of 100 to 220° C.

9. A process for manufacturing the composition (C) according to claim 1, comprising mixing:
the at least one epoxy compound E,
the at least one PAES (I-1) polymer,
the at least one PAES (I-2) polymer,
optionally, the at least one curing agent, and
optionally, the at least one accelerator.

10. A process for making a cured compound from the composition (C) according to claim 1, comprising mixing and heating the at least one epoxy compound E, the at least one PAES (I-1) polymer, the at least one PAES (I-2) polymer, the at least one curing agent, optionally, the at least one accelerator, and optionally, at least one other ingredient.

11. A process for making a cured compound, comprising processing the composition (C) according to claim 1 by resin transfer molding, continuous resin transfer molding, vacuum assisted resin transfer molding, vacuum assisted injection moulding, vacuum assisted processing, vacuum infusion moulding, vacuum bag curing, press molding, Seeman Composite resin infusion, resin film infusion, resin infusion under flexible tooling, automated fiber placement, filament winding, pultrusion, or thermal expansion molding.

12. A cured compound made by the process according to claim 10.

13. An article comprising the cured compound according to claim 12 wherein the article is an aircraft structural component, a secondary aircraft component, an automotive structural component, oil well lining tubes, a power transmission tube, a printed circuit board, a rail component, or a wind power generation component.

* * * * *